(12) United States Patent
Raz-Pelleg et al.

(10) Patent No.: US 8,756,459 B2
(45) Date of Patent: Jun. 17, 2014

(54) FAULT DETECTION BASED ON DIAGNOSTIC HISTORY

(75) Inventors: Orna Raz-Pelleg, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/285,011

(22) Filed: Oct. 31, 2011

(65) Prior Publication Data

US 2013/0111272 A1    May 2, 2013

(51) Int. Cl.
*G06F 11/00* (2006.01)

(52) U.S. Cl.
USPC ................ 714/37; 714/21; 714/25; 714/26; 714/31

(58) Field of Classification Search
USPC .................................. 714/21, 25, 26, 31, 37
See application file for complete search history.

(56) References Cited

U.S. PATENT DOCUMENTS

| | | | |
|---|---|---|---|
| 6,484,128 B1 * | 11/2002 | Sekiya et al. | 702/185 |
| 6,826,683 B1 * | 11/2004 | Suermondt et al. | 713/100 |
| 6,826,754 B1 | 11/2004 | Miller | |
| 6,944,759 B1 * | 9/2005 | Crisan | 713/100 |
| 7,120,559 B1 * | 10/2006 | Williams et al. | 702/185 |
| 7,203,881 B1 * | 4/2007 | Williams et al. | 714/741 |
| 7,269,768 B2 | 9/2007 | Rothman et al. | |
| 7,337,365 B2 | 2/2008 | Zunino et al. | |
| 7,409,318 B2 * | 8/2008 | Dulberg et al. | 702/184 |
| 2008/0016385 A1 * | 1/2008 | Hollingsworth et al. | 714/3 |
| 2008/0168311 A1 | 7/2008 | Pietrek | |
| 2008/0183852 A1 * | 7/2008 | Pramer et al. | 709/223 |
| 2008/0295077 A1 | 11/2008 | Sengupta et al. | |
| 2011/0126055 A1 * | 5/2011 | Shimada et al. | 714/37 |
| 2011/0154097 A1 * | 6/2011 | Barlow et al. | 714/3 |

OTHER PUBLICATIONS

Smedman Krister E., "A Power Supply System Application for a Large Telecom Data Center", The Ninth International Telecommunications Energy Conference, 1987. INTELEC '8,pp. 182-186, Jun. 1987.

* cited by examiner

*Primary Examiner* — Charles Ehne
(74) *Attorney, Agent, or Firm* — Jason F. Far-hadion, Esq; Century IP Group (57) ABSTRACT

Systems and methods for detecting faults in a system. The method comprising maintaining diagnostic history for one or more system components; receiving system information about operational state and relational interaction among system components; determining if one or more system components are to be examined, in response to performing an analysis of the diagnostic history, wherein the analysis is performed to determine if the diagnostic history includes any information that may indicate that certain system components or combinations of components are suspected of causing a problem detected in the system, wherein the diagnostic history is maintained based on an at least one examination performed on said one or more components when said one or more components were installed in a system other than the system in which the problem is detected.

24 Claims, 4 Drawing Sheets

FAULT DETECTION BASED ON DIAGNOSTIC HISTORY

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to determining faults in a system and, more particularly, to a system and method for efficiently determining faults in a system based on an analysis of the diagnostic history of the same or similar system components.

BACKGROUND

In a complex system with multitudes of components, the system as a whole may suffer from performance degradation, even when most system components, if monitored or tested individually, report no level of fault or unusual activity. In particularly large computing environments, solving the above problem can be very challenging and expensive or virtually impractical.

For example, an online service provider may have an infrastructure that includes different computer servers in communication with different types of storage servers that in turn interact with many storage switches, controllers, etc. If the individual components seem healthy, but the system as a whole is not performing well, the interaction between the multiple components may have to be tested exhaustively.

The interaction between certain system components may have been previously tested by the vendor of one or more components before the components were installed in a customer's system. For example, before releasing a new server, the server vendor may have tested the server's operation in environments with different interface cards, network switches, storage devices, other servers, etc.

When a customer has a problem with one of the components that have been integrated into the customer's environment, it would be helpful to have access to the vendor's test records, even if the customer's environment does not exactly match that of the vendor's. The vendor's test records may include information that could be used to diagnose the problem in the customer's environment.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for detecting faults in a system comprises maintaining diagnostic history for one or more system components; receiving system information about operational state and relational interaction among system components; determining if one or more system components are to be examined, in response to performing an analysis of the diagnostic history, wherein the analysis is performed to determine if the diagnostic history includes any information that may indicate that certain system components or combinations of components are suspected of causing a problem detected in the system, wherein the diagnostic history is maintained based on an at least one examination performed on said one or more components when said one or more components were installed in a system other than the system in which the problem is detected.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods. In one embodiment, a method for providing a service to a customer over a network is provided in association with the functions and operations performed by the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
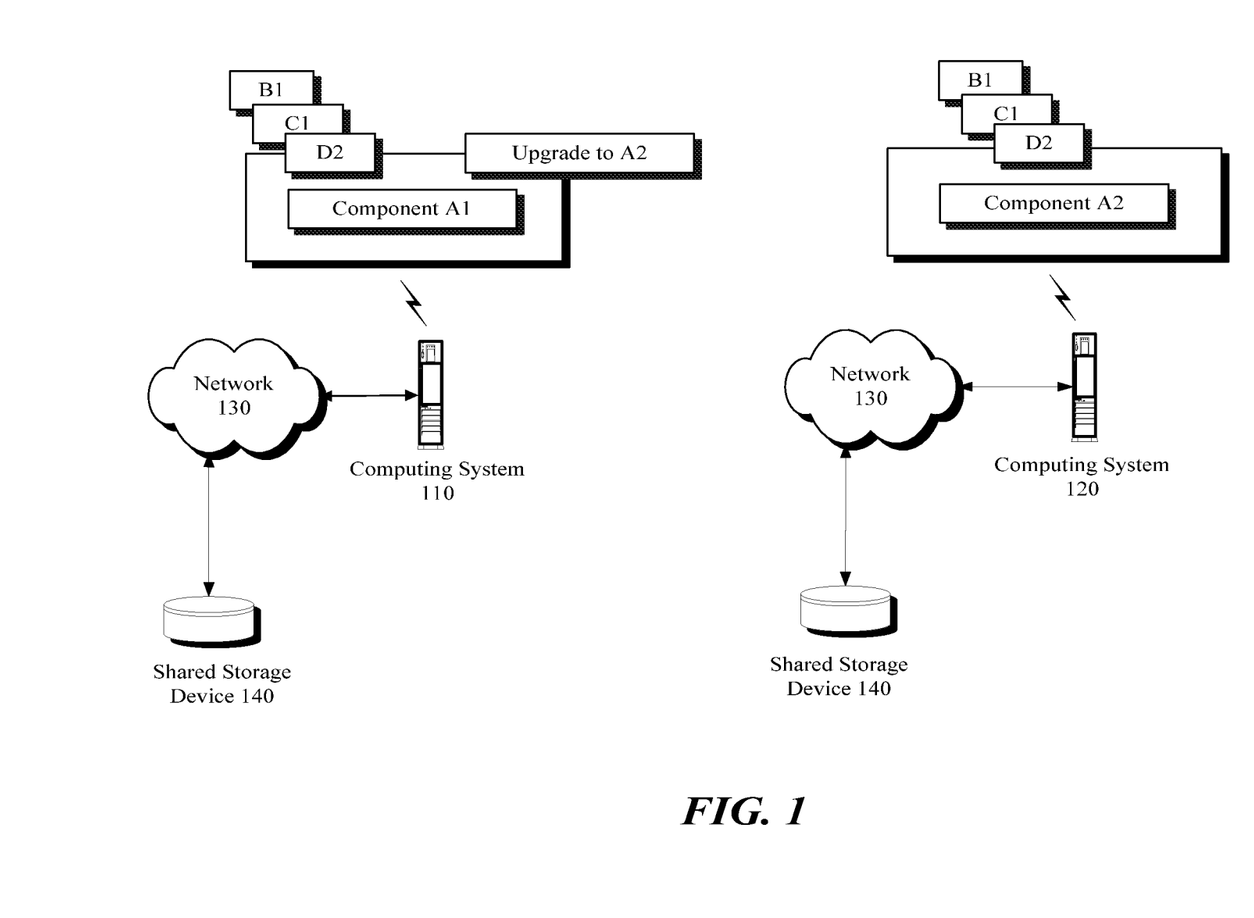
FIG. 1 illustrates exemplary operating environments in which same or similar components are deployed on two separate computing systems, in accordance with one or more embodiments.

Referring to FIG. 1, exemplary operating environments are illustrated in which same or similar components (e.g., A1, A2, B1, C1, D2) are deployed on two separate computing systems (e.g., computing systems 110 and 120). As shown, the components in each system are in communication with a shared storage device 140, for example, via a network 130. The components may be operational hardware or software components. In one exemplary scenario, component A1 may be upgradable to A2.

Figure 2:
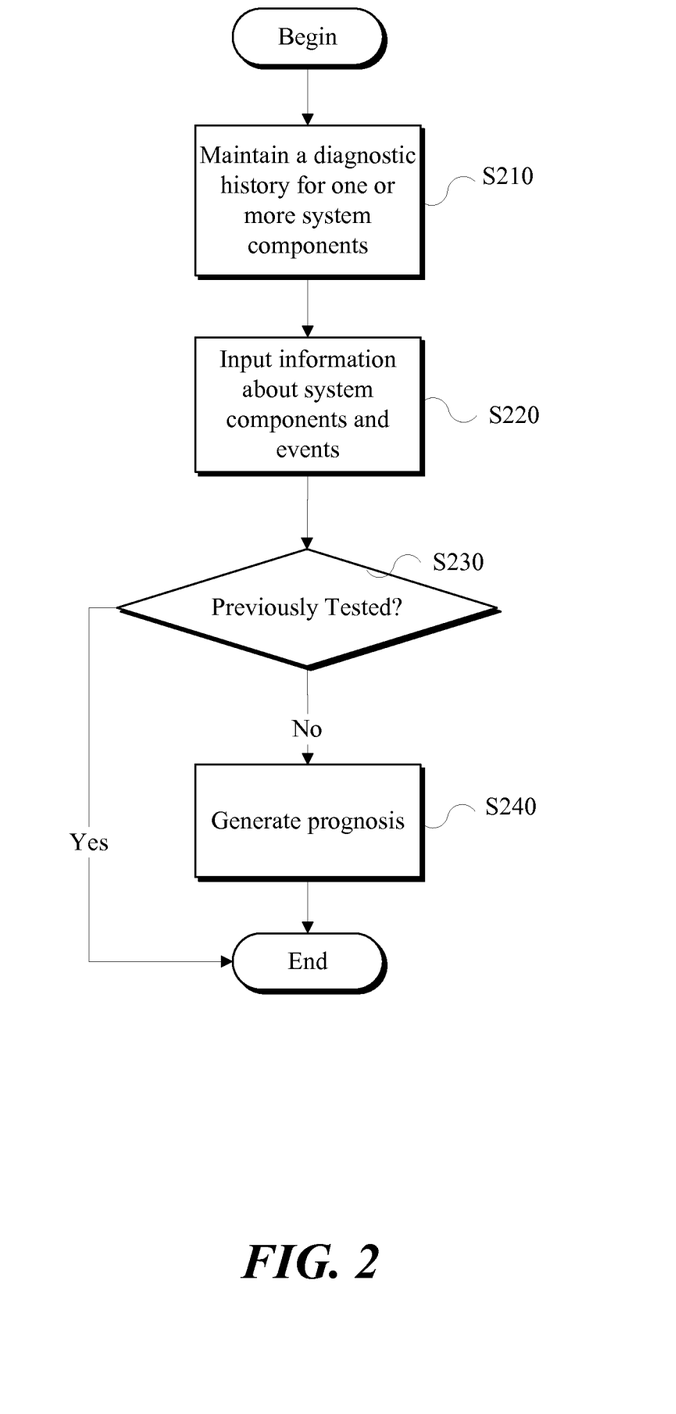
FIG. 2 is an exemplary flow diagram of a method for providing a prognosis for faults in a system, in accordance with one embodiment.

Referring to FIG. 2, in accordance with one embodiment, knowledge about the system components and the interactions between said components may be used to build a database that includes information about the various components and the relationship between the different components. When a system is tested (e.g., as a part of a scheduled maintenance or due to a fault in the system), a diagnostic history for the system as a whole or for the one or more components that were tested is maintained (S210).

In certain embodiments, the test performed on one or more system components may have been performed at a different facility or when the components were integrated into a computing environment other than the present environment. An example of such situation is when a component was previously tested by the component manufacturer in a first computing environment (e.g., one or more computing systems 120) as opposed to the current computing environment (e.g., computing system 110). In such a scenario, test records may be available to indicate whether said component was tested in combination with certain other components in the first environment.

The diagnostic history may include information about the state of the system in the first environment or the current environment and the individual components included in the first environment or the current environment. Further the inter-operational relationships among a combination of components at the time the maintenance or tests were performed may be also recorded. If a fault was detected when the test was performed in the first environment, the diagnostic history may reflect the reason for the fault, the culprit components and the relationship between the components involved. If the detected faults or system problems were solved, the diagnostic history may also reflect the solution or the reasons for the detected problems.

Referring to FIG. 1, computing system 120 may be in a test environment, wherein component A2 was tested against several other components (e.g., B1, C1, D2 and a shared storage device 140) in network 130. The test records for various components or combination of components may be collected and included in the diagnostic history for computing system 120. The diagnostic history may indicate that component A2, when tested in combination with components B1, C1 and D2 successfully passed one or more tests. The diagnostic history may further indicate that some problems were observed when the above combinations of components were tested together. Depending on implementation, the diagnostic history may be silent or detailed as to the source or cause of the problems.

In FIG. 1, computing system 110 represents another environment in which component A1 interacts with other components B1, C1, D2 and a shared storage device 140 in network 130. Computing systems 110 and 120 may be identical, equivalent or interchangeable server machines. Component A1 interacts with computing system 110, and component A2 interacts with computing system 120. The diagnosis history for the test environment in computing system 120 may include details that reflect that when a component A1 was upgraded to component A2, system performance degraded, such that processing of storage requests submitted to shared storage device 140 were delayed beyond an acceptable threshold.

In some embodiments, the diagnostic history may further indicate that the degradation in storage performance was resolved when, for example, additional memory was added to a system component (e.g., to computing system 120), after the installation of the upgraded component A2, despite that component A2's functional nature may have been deemed unrelated to operational integrity of shared storage device 140. In a similar manner, other diagnostic information for other components or combination of components may be maintained as additional issues arise.

Referring to FIGS. 1 and 2, computing system 110 may be experiencing performance problems, but no information may be readily available to indicate that a particular system component is malfunctioning. In such circumstances, the diagnostic history for one or more components that have been previously tested would be useful for troubleshooting purposes. Depending on implementation, the diagnostic history may include information collected for tests applied to components or combination of components in either a prior test environment (e.g., computing system 120) or the current environment (e.g., computing system 110) or both.

In one embodiment, to determine whether the information recorded in the diagnostic history is helpful, data about the components in computing system 110 and related events between said components may be input to an analysis tool (not shown) that has access to the recorded diagnostic history (S220). The input information, in addition, may include state information about computing system 110 or its components, details about the type, kind or version of a component installed on computing system 110 or any other information that may be useful to the analysis tool.

Continuing on with the example mentioned earlier, let's assume that in computing system 110 component A1 is updated to component A2. Thus, the information that is input to the analysis tool in addition to indicating that components B1, C1 and D2 are installed on computing system 110 will indicate that an updated version of component A1 (i.e., component A2) is now installed on computing system 110. As such, the analysis tool based on the input information may be able to generate a model for computing system 110 as provided in further detail below.

Depending on implementation, the analysis tool may analyze the model using the recorded diagnostic history data to determine if a match is found between the components currently included in computing system 110 and components in computing system 120. The analysis tool may further determine from the diagnostic history, which components or combination of components have been tested (S230). The testing may had been performed, in one embodiment, by way of analyzing n-wise combinations of components.

Referring back to FIG. 2, if the analysis tool determines that certain system components or combinations of components in computing system 110 were not previously tested according to the diagnostic history, then a prognosis is generated (S240). The prognosis may be in the form of a list of suggested components or combination of components, wherein the list either indicates that certain components or combination of components have been tested, or that certain components or combination of components have not been tested, or both. In other words, the prognosis is to point a technician or system administrator in a direction to consider testing combinations of components that are more conducive to detecting the problem associated with the system.

In the above exemplary scenario, the analysis tool may find that previously (e.g., when tests were performed on components installed on computing system 120) one or more combinations of components were tested. As such, the analysis tool may generate a list that indicates the tested combination so that a technician may determine that said combination of components are least likely to have caused a problem, because they have been successfully tested before. In addition, or alternatively, the analysis tool may generate a list of new combinations, excluding the tested combinations, suggesting a technician to concentrate on testing a series of untested combinations instead.

In some embodiments, the diagnostic history may also indicate that the upgraded component A2, when tested in combination with one or more components in computing system 120, was the source of a problem that was detected when shared storage device 140 and component A2 interacted. The generated prognosis may provide an indication that, for example, the interaction between computing 110 and upgraded component A2 is suspect and that it should be tested.

Even further, suggestions may be provided about the course of action that may need to be taken (e.g., the analysis tool may suggest upgrading the memory on computing system 110 since the same action when applied to computing system 120 remedied a similar problem). If the diagnostic history is well-developed, the analysis tool may suggest different solutions or further indicate that additional components or component combinations may be suspect and therefore may need to be tested. Depending on implementation, the generated list may be sorted in a logical order such that certain suggestions (e.g., combination of components) are listed more or less prominently in the list.

The analysis tool may be configured to recognize that a certain component in the system being tested is equivalent, interchangeable or similar to a component in the diagnostic history that was tested previously. For example, referring to computing system 110 in FIG. 1, assume that A1 is not yet upgraded to A2. In such a case, analysis tool may determine that A1 is interchangeable, equivalent or similar to A2. If the diagnostic history indicates that, for example, combination of components including: {A2, B1}, {A2, C1}, {A2, D2}, {D2, C1} and {B1, C1} were previously tested in computing system 120, then the analysis tool may exclude, or lower the ranking of the following combination of test when trying to detect the problems in computing system 110: {A1, B1}, {A1, C1}, {A1, D2}.

Furthermore, if the diagnostic history suggests that most combinations of A2 or C1 with other components were successfully tested previously, then the analysis tool may suggest tests that are directed to combinations of B1 or D2 with other components. In one embodiment, the components or component combinations that have a history of proper functionality, as reflected in the diagnostic history, or components that may be deemed interchangeable to said components may be skipped or listed less prominently, so that the more problematic components or combinations are considered first. Following the same logic, components or combinations that have a problematic history may be listed in more prominent positions, colors or styles, so that those are considered, spotted or tested earlier.

As such, for the components or combination of components for which a diagnostic history is present, a technician may use the related history to determine which tests or inspections need to be performed in order to solve the problems associated with the system. For the components or combination of components that have a problematic or no diagnostic history, then the technician may spend time on testing or inspecting those components first. As noted earlier, the technician will also be able to use the diagnostic history to test similar components or components in the same category as the components or combinations that have been found to have a problematic past.

In one embodiment, the diagnostic history collected at local sites or isolated systems may be pooled with diagnostic history gathered from other sites that may have the same or similar architecture or component interactions. The pooled data may be used to create, for example, a consolidated (e.g., global) database that includes a collective diagnostic history that continues to grow based on feedback provided by the participating systems when, for example, new problems, new fixes, new prognosis or new associations and inter-operations among system components are discovered.

The database may be also mined to provide a profile for service providers or customers, while complying with confidentiality provisions and standards. The profile may be used for a variety of reasons, such as offering new services or products that may be useful or beneficial to a customer or sending updates about related fixes or system upgrades. The profile information may also be utilized for the purpose of providing other valuable services, such as targeted automatic updates, promotional offerings, and more.

Using a diagnostic tool or service such as that mentioned above is in the interest of system integrators, because it reduces the average cost of dealing with hard to detect system level problems. Providing the above mentioned services is also in the interest of component vendors, because the services make the products more attractive to system integrators. Further a vendor by providing the noted services may use the collected diagnostic history to learn about customer configurations and test suites. Knowledge about customer configurations is also valuable for marketing and planning.

The collected information, in one embodiment, may be utilized to determine how to develop or adjust customer configurations or test models to better meet customers' needs. In one embodiment, the diagnostic tools or services mentioned above may be provided to customers according to a service subscription or agreement, wherein a customer's system configuration and optionally the type of problems associated with the customer's system are communicated over a network to the service provider, and in return the service provider responds by suggesting how to best test or diagnose the customer's system.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
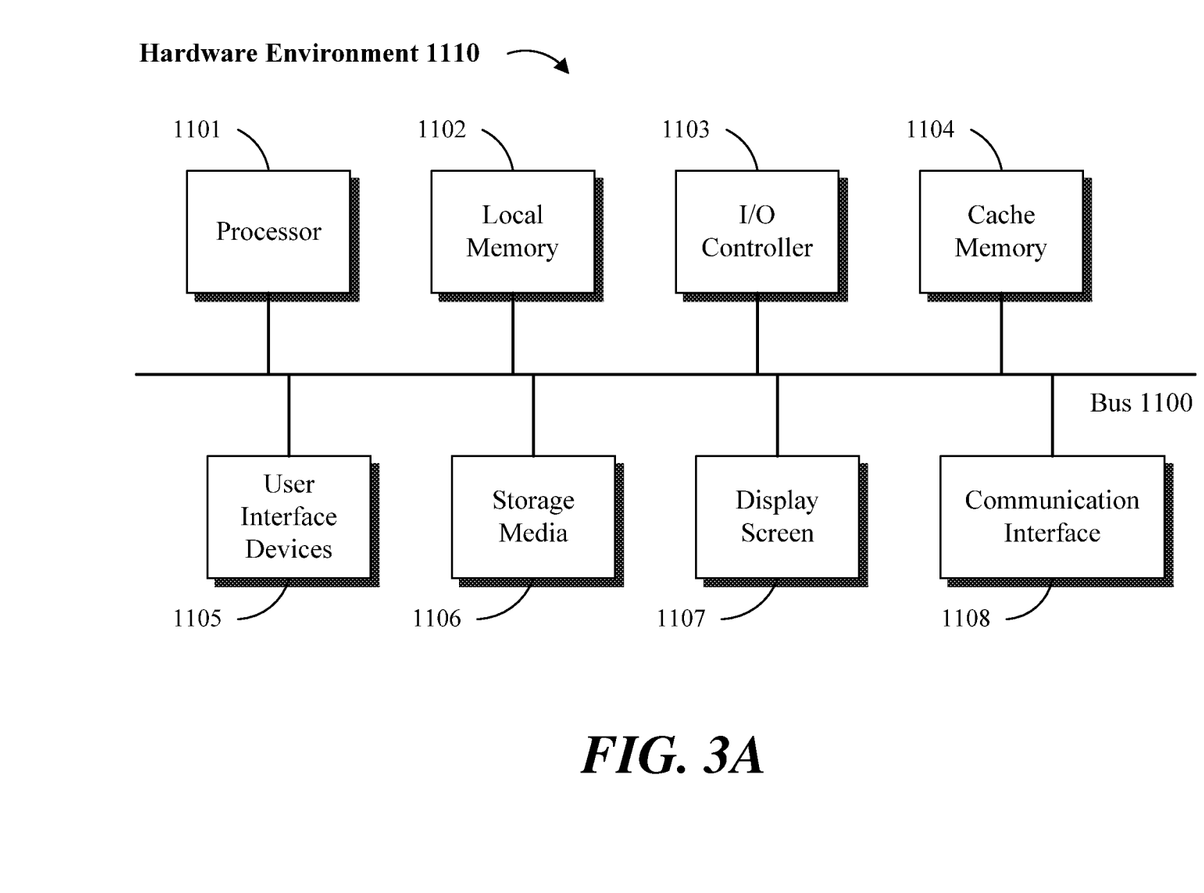
FIGS. 3A and 3B are block diagrams of hardware and software environments in which the disclosed systems and methods may operate, in accordance with one or more embodiments.
Figure 3B:
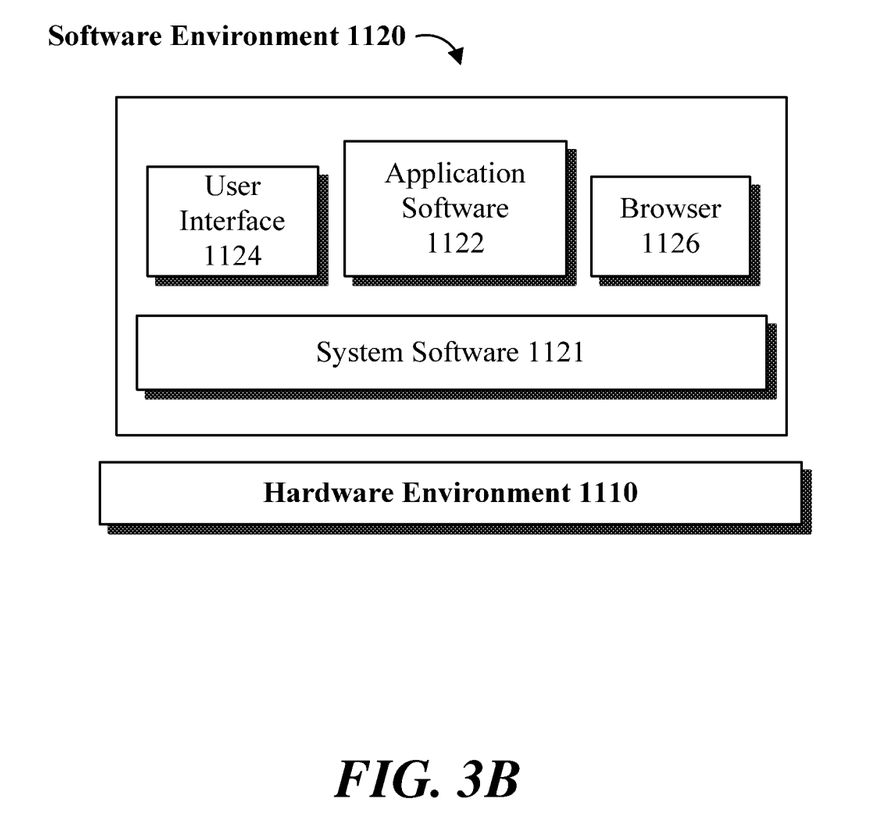

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executed on one or more processors for detecting faults in a system, the method comprising:
   maintaining diagnostic history for one or more system components;
   receiving system information about operational state and relational interaction among system components;
   determining if one or more system components are to be examined, in response to performing an analysis of the diagnostic history, wherein the analysis is performed to determine if the diagnostic history includes any information that may indicate that certain system components or combinations of components are suspected of causing a problem detected in the system, wherein the diagnostic history is maintained based on an at least one examination performed on said one or more components when said one or more components were installed in a system other than the system in which the problem is detected; and wherein the other system includes a test system at a vendor's location, wherein said vendor manufactures, distributes or is otherwise concerned about the proper functionality of said one or more system components in combination with each other.

2. The method of claim 1, wherein the diagnostic history includes information about successful test history of combinations of components present in a first system and said diagnostic history is analyzed to determine examinations that are to be performed on combinations of components in a second system that has one or more components that are the same as one or more components in the first system.

3. The method of claim 1, wherein the diagnostic history includes information about successful test history of combinations of components present in a first system and said diagnostic history is analyzed to determine examinations that are to be performed on combinations of components in a second system that has one or more components that are similar to one or more components in the first system.

4. The method of claim 1, wherein the diagnostic history includes information about successful test history of combinations of components present in a first system and said diagnostic history is analyzed to determine examinations that are to be performed on combinations of components in a second system that has one or more components that are interchangeable with one or more components in the first system.

5. The method of claim 1 further comprising generating a list of one or more system components or combinations of components that are suspect.

6. The method of claim 5 wherein the system components or combinations of components that are deemed to be more suspect of causing the detected problem are more prominently displayed in the list.

7. The method of claim 6 wherein a system component is deemed to be more suspect if the diagnostic history reveals that said component was not examined when installed in the other system.

8. The method of claim 6 wherein a combination of system components is deemed to be more suspect if the diagnostic history reveals that said combination of components were not tested together when installed in the other system.

9. The method of claim 1 wherein the diagnostic history includes a compilation of information that indicate whether a combination of components in the system were successfully tested together in a plurality of other systems.

10. A system comprising on one or more processors for detecting faults in a system, the system comprising:
a logic unit for maintaining diagnostic history for one or more system components;
a logic unit receiving system information about operational state and relational interaction among system components;
a logic unit determining if one or more system components are to be examined, in response to performing an analysis of the diagnostic history, wherein the analysis is performed to determine if the diagnostic history includes any information that may indicate that certain system components or combinations of components are suspected of causing a problem detected in the system,
wherein the diagnostic history is maintained based on an at least one examination performed on said one or more components when said one or more components were installed in a system other than the system in which the problem is detected; and
wherein the other system includes a test system at a vendor's location, wherein said vendor manufactures, distributes or is otherwise concerned about the proper functionality of said one or more system components in combination with each other.

11. The system of claim 10, wherein the diagnostic history includes information about successful test history of combinations of components present in a first system and said diagnostic history is analyzed to determine examinations that are to be performed on combinations of components in a second system that has one or more components that are the same as one or more components in the first system.

12. The system of claim 10, wherein the diagnostic history includes information about successful test history of combinations of components present in a first system and said diagnostic history is analyzed to determine examinations that are to be performed on combinations of components in a second system that has one or more components that are similar to one or more components in the first system.

13. The system of claim 10, wherein the diagnostic history includes information about successful test history of combinations of components present in a first system and said diagnostic history is analyzed to determine examinations that are to be performed on combinations of components in a second system that has one or more components that are interchangeable with one or more components in the first system.

14. The system of claim 10 further comprising a logic unit for generating a list of one or more system components or combinations of components that are suspect.

15. A method of providing a service to a customer over a network for detecting faults in a system, the service comprising:
maintaining diagnostic history for one or more system components;
receiving system information about operational state and relational interaction among system components;
determining if one or more system components are to be examined, in response to performing an analysis of the diagnostic history, wherein the analysis is performed to determine if the diagnostic history includes any information that may indicate that certain system components or combinations of components are suspected of causing a problem detected in the system,
wherein the diagnostic history is maintained based on an at least one examination performed on said one or more components when said one or more components were installed in a system other than the system in which the problem is detected; and
wherein the other system includes a test system at a vendor's location, wherein said vendor manufactures, distributes or is otherwise concerned about the proper functionality of said one or more system components in combination with each other.

16. The method of claim 15, wherein the diagnostic history includes information about successful test history of combinations of components present in a first system and said diagnostic history is analyzed to determine examinations that are to be performed on combinations of components in a second system that has one or more components that are the same as one or more components in the first system.

17. The method of claim 15, wherein the diagnostic history includes information about successful test history of combinations of components present in a first system and said diagnostic history is analyzed to determine examinations that are to be performed on combinations of components in a second system that has one or more components that are similar to one or more components in the first system.

18. The method of claim 15, wherein the diagnostic history includes information about successful test history of combinations of components present in a first system and said diagnostic history is analyzed to determine examinations that are to be performed on combinations of components in a second system that has one or more components that are interchangeable with one or more components in the first system.

19. The method of claim 15, the service further comprising generating a list of one or more system components or combinations of components that are suspect.

20. A computer program product comprising a non-transitory data storage medium having a computer readable program, wherein the computer readable program when executed on a computer causes the computer to:
  maintain diagnostic history for one or more system components;
  receiving system information about operational state and relational interaction among system components;
  determine if one or more system components are to be examined, in response to performing an analysis of the diagnostic history, wherein the analysis is performed to determine if the diagnostic history includes any information that may indicate that certain system components or combinations of components are suspected of causing a problem detected in the system,
  wherein the diagnostic history is maintained based on an at least one examination performed on said one or more components when said one or more components were installed in a system other than the system in which the problem is detected, and
  wherein the other system includes a test system at a vendor's location, wherein said vendor manufactures, distributes or is otherwise concerned about the proper functionality of said one or more system components in combination with each other.

21. The computer program product of claim 20, wherein the diagnostic history includes information about successful test history of combinations of components present in a first system and said diagnostic history is analyzed to determine examinations that are to be performed on combinations of components in a second system that has one or more components that are the same as one or more components in the first system.

22. The computer program product of claim 20, wherein the diagnostic history includes information about successful test history of combinations of components present in a first system and said diagnostic history is analyzed to determine examinations that are to be performed on combinations of components in a second system that has one or more components that are similar to one or more components in the first system.

23. The computer program product of claim 20, wherein the diagnostic history includes information about successful test history of combinations of components present in a first system and said diagnostic history is analyzed to determine examinations that are to be performed on combinations of components in a second system that has one or more components that are interchangeable with one or more components in the first system.

24. The computer program product of claim 20 wherein a list of one or more system components or combinations of components that are suspect is generated.

* * * * *